United States Patent Office 3,591,621
Patented July 6, 1971

3,591,621
METHOD FOR FORMING NITRILE
COMPOUNDS
William M. Hutchinson, Bartlesville, Okla., assignor to
Phillips Petroleum Company
No Drawing. Filed Nov. 15, 1965, Ser. No. 507,700
Int. Cl. C07c 121/02, 121/08, 121/40
U.S. Cl. 260—465.4    5 Claims

ABSTRACT OF THE DISCLOSURE

Multifunctional compounds are prepared by reacting certain nucleophiles such as sodium cyanide, certain olefinically or acetylenically unsaturated compounds such as acrylonitrile, and an alkylating agent such as ethylchloroacetate in the presence of a dipolar aprotic solvent such as dimethylformamide.

---

This invention relates to a new and improved method for forming certain multi-functional compounds and the compounds produced thereby.

Heretofore reactions wherein three separate compounds combined to form a single product compound, sometimes called ABC reactions wherein the letters A, B, and C represent each of the three reacting compounds, have been known for some materials. However, for other compounds reactions other than the ABC reaction were more prominent, e.g. an ABB reaction or an $AB_x$ polymerization reaction. In fact, reactions other than the ABC reaction have been so prominent that they sometimes came to be the expected reaction. Also heretofore, ABC reactions have generally required more than one reaction step and each step lowered the overall yield of the final ABC compound.

Quite surprisingly, it has been found that when certain nucleophiles (A), certain olefinically and acetylenically unsaturated compounds (B), and alkylating agents (C), all as hereinafter defined, are reacted in the presence of a dipolar aprotic solvent the ABC reaction is prominent and a multi-functional compound is thereby produced in a single reaction step.

There is also provided according to this invention certain novel multifunctional compounds.

Accordingly, it is an object of this invention to provide a new and improved method for making a multi-functional compound. Another object of this invention is to provide novel multi-functional compounds.

Other aspects, objects and the several advantages of this invention will be readily apparent to those skilled in the art from the description and the appended claims.

According to this invention multi-functional compounds are synthesized by contacting under reaction conditions and in the presence of a dipolar aprotic solvent at least one nucleophile selected from the group consisting of the compounds having the formula $M(CN)_n$, $M(NO_2)_n$, $M(SCN)_n$, $MI_n$, $(R^2O)_nM$, $(R^2S)_nM$; at least one compound selected from the group consisting of compounds having formulas

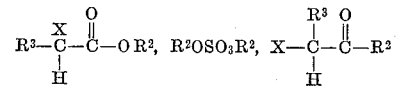

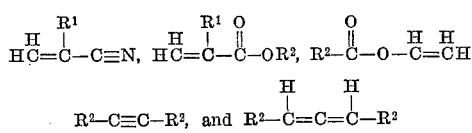

and at least one alkylating agent selected from the group consisting of compounds having formulas

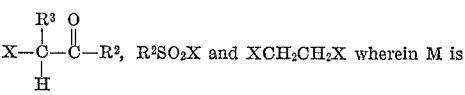

-R², R²SO₂X and XCH₂CH₂X wherein M is selected from the group consisting of alkali metals, magnesium, and quaternary ammonium ions of the formula $(R^2)_4N+$, preferably alkali metals; $n$ is 1 or 2; $R^1$ is selected from the group consisting of hydrogen and methyl; $R^2$ is selected from the group consisting of alkyl, aryl, cycloalkyl and combinations thereof such as alkaryl, aralkyl, and the like containing from 1 to 10 carbon atoms, inclusive, preferably alkyl containing from 1 to 4 carbon atoms, inclusive; $R^3$ is selected from the group consisting of hydrogen and $R^2$; and X is chlorine or bromine.

By the term "aprotic solvent" is meant a solvent which is non-proton ($H^+$) donating, i.e. is without protons to supply to the reaction of this invention. By the term "dipolar" it is meant a material the molecules of which are non-symmetrical because of the bonding of unlike atoms, and the like so that the centers of the positive and negative charge in the molecule do not coincide and the molecule has a positive and negative end, i.e. is an electrical dipole, and as such exhibits an electrical or dipole moment.

The dipolar aprotic solvents of this invention are organic solvents and include, N,N-dimethyl amides of the formula $$R\overset{O}{\overset{\|}{C}}N(CH_3)_2$$

wherein R is selected from the group consisting of hydrogen or alkyl radicals containing from 1 to 3 carbon atoms, inclusive, e.g., N,N-dimethylformamide, N,N-dimethylacetamide, and N,N - dimethylbutyramide, and cyclic sulfones such as trimethylene sulfone and tetramethylene sulfone (tetrahydrothiophene-1,1-dioxide or sulfolane). Another solvent is N-methyl-2-pyrrolidone.

Some examples of nucleophiles which can be employed in this invention are: sodium cyanide, potassium cyanide, lithium nitrite, sodium nitrite, tetramethylammonium nitrite, magnesium nitrite, potassium thiocyanate, cesium cyanide, rubidium iodide, magnesium iodide, sodium iodide, sodium methylate, potassium butoxide, lithium n-decoxide, sodium phenoxide, sodium benzyl mercaptide, the potassium salt of cyclohexanethiol and the like.

Some examples of olefinically and acetylenically unsaturated compounds which can be employed in this invention are: acrylonitrile, methacrylonitrile, methyl acrylate, ethyl methacrylae, phenyl acrylate, p-tolyl methacrylate, benzyl acrylate, n-decyl acrylate, cyclohexyl methacrylate, vinyl acetate, vinyl butyrate, vinyl benzoate, vinyl 4-methylcyclohexanoate, 2-butyne, 1,2-diphenylacetylene, 1,2 - dicyclohexylacetylene, 3,4-heptadiene, 1,3-diphenylallene, and the like.

Some examples of alkylating agents which can be employed in this invention are methyl chloroacetate, ethyl bromoacetate, cyclohexyl alphachlorodecanoate, n-decyl alpha-bromophenylacetate, dimethyl sulfate, diethyl sulfate, di-n-decyl sulfate, diphenyl sulfate, decylcyclooctyl sulfate, chloroacetone, alpha-chloroethyl phenyl ketone, alpha-chlorobenzyl n-decyl ketone, chloromethyl benzyl ketone, alpha-bromopropyl cyclohexyl ketone, methanesulfonyl chloride, n-pentanesulfonyl chloride, benzenesulfonyl chloride, cyclohexanesulfonyl chloride, 4-n-butylbenzenesulfonyl chloride, ethylene dichloride, ethylene dibromide, and the like.

The process of this invention is generally carried out by contacting at least one compound from each of the three above-described groups of compounds substantially at the same time in the dipolar aprotic solvent. The reaction temperature can vary widely, but the reaction is normally effected at a temperature from about −25 to about 200, preferably from about 0 to about 100, ° C. The mol ratio of the three reactants can vary widely, but generally the mol ratios of the nucleophile or the alkylating agent each to the olefinically or acetylenically unsaturated compound will both range from about 0.1/1 to about 10/1. The mol ratios can be varied depending on the desired product, reaction temperature and many other factors known to those skilled in the art but in many instances, it is preferred to operate under essentially equimolar conditions. Reaction times can also vary widely, ranging from a few minutes, e.g. 3, to several days, e.g. 3. The pressure employed can be autogenous and should be sufficient to maintain the reactants and solvent substantially in the liquid phase.

After the reaction has taken place any well known process for recovering a product from a reaction mixture can be employed such as solvent extraction, crystallization, fractional distillation, vaporization, and the like.

As will be obvious from the examples hereinbelow, a wide variety of multi-functional compounds can be prepared according to this invention. For example, the reaction of sodium cyanide (A), acrylonitrile (B), and ethyl chloroacetate (C) yields 3-cyano-3-cyanomethylglutaric acid diethyl ester and 3,5,6-tricyanohexanoic acid ethyl ester. These two compounds are novel and are useful as intermediates in that they can be converted to polycarboxylic acids by hydrolysis. They can also be used as plasticizers for polar rubbers, polar resins such as polyvinyl chloride, and in the formation of agricultural chemicals. Other novel compounds formed by this invention which have uses substantially the same as those set forth above are 3,4 - bis - (carbethoxy)-2-isoxazoline, 3-carboxy-5-cyanomethyl-adipic acid triethyl ester, and 2-cyanomethyl-adipic acid dimethyl ester. This invention has the very distinct advantage of being a substantially one-step synthesis which not only has obvious operational advantages but also promotes increased yields of a desired product since it is known that a plurality of steps in any process generally tends to lower the overall yield of the desired product of that process. Also, it is important to note that this invention relates to an anionic polymerizaion that is aborted in the first or second stage of polymerization and that not only is a two-step process uneconomical compared to the single step of this invention but it is inoperable because an $AB_x$ product will result when C is not present initially and a BC product cannot be formed since both B and C are electrophiles.

In all of the following examples the reactions were carried out in a standard reaction system designed to exclude moisture and air, provide reflux cooling and external heating and cooling, magnetic stirring, and various means of adding ingredients including powders, liquids, and moisture and air sensitive liquids handled by syringe. The system used comprised a flask with 3 standard tapered necks, and having a 500 milliliter capacity. The flask was fitted with a reflux condenser leading through a drying tube to a conventional bubble counter or gas-sample collector. The flask was fitted with a thermometer, a plug, nitrogen inlet tube or rubber dam for the two other necks, and a magnetic stirring bar. The glass equipment was baked in a oven at 120° C. or higher overnight. The equipment was purged with nitrogen while cooling. Solvent, olefinically and acetylenically unsaturated compound, and alkylating agent were injected by syringe into the reactor through an open neck or dam.

The reaction mixture was filtered under anhydrous conditions to remove by-product precipitates and the filtrate distilled at least one time in a Vigreux column to remove low boiling product and solvent and obtain fractions of the product or products of the reaction.

Conventional gas chromatography, elemental analysis, infrared analysis, and nuclear magnetic resonance techniques were employed in analyzing the product of the reaction and the yields thereof.

EXAMPLE I

Into the reaction system were charged, in order:

53.0 g. (1.00 mole) of acrylonitrile (B)
122.5 g. (1.00 mole) of ethyl chloroacetate (C)
50 ml. of sulfolane (solvent)
49.0 g. (1.00 mole) of sodium cyanide (A)

The reaction mixture was heated at a temperature of from 90 to 120° C. for 4 hours and thereafter maintained at about 25° C. for 18 hours.

The reaction mixture was filtered and the filtrate distilled to yield two products, i.e. 18 grams of 3,4-dicyanobutyric acid ethyl ester ($C_8H_{10}N_2O_2$) and 38 grams of 3 - cyano - 3 - cyanomethyl - glutaric acid diethyl ester ($C_{12}H_{16}N_2O_4$), major fractions of each of which by elemental analysis and molecular weight determination by lowering of the vapor pressure of benzene ("Osmometer") gave the following results:

3,4-dicyanobutyric acid ethyl ester, boiling range, 113–115° C./15 m.m

| Analysis | Found, percent | Atom Ratio | Calculated for $C_8H_{10}N_2O_2$, percent. |
|---|---|---|---|
| Carbon | 57.75 | 8.00 | 57.8 |
| Hydrogen | 6.30 | 10.32 | 6.1 |
| Nitrogen | 16.4 | 1.96 | 16.9 |
| Total | 80.45 | | |
| Oxygen | 19.56 | 2.03 | 19.2 |

NOTE.—Molecular weight: Found, 176; calculated, 166.

3-cyano-3-cyanomethyl-glutaric acid diethyl ester, boiling range 169–172° C./3.0 m.m., $n_D^{20}$ 1.4546

| Analysis | Found, percent | Atom ratio | Calculated for $C_{12}H_{16}N_2O_4$, percent |
|---|---|---|---|
| Carbon | 57.15 | 12.00 | 57.1 |
| Hydrogen | 6.45 | 16.03 | 6.4 |
| Nitrogen | 11.2 | 2.00 | 11.1 |
| Total | 74.80 | | |
| Oxygen | 25.20 | 3.95 | 25.4 |

NOTE.—Molecular weight: Found, 255; calculated, 252.

From the above data it can be seen that the products are of the ABC and $ABC_2$ types, respectively.

EXAMPLE II

Into the reaction system were charged, in order:

150 ml. of dimethylformamide (solvent)
10.6 g. (0.20 mole) of acrylonitrile (B)
24.5 g. (0.20 mole) of ethyl chloroacetate (C)
9.8 g. (0.20 mole) of sodium cyanide (A)

The reaction mixture was heated to a temperature of from 60 to 70° C. for 6 hours after which it was maintained at about 25° C. for 18 hours. Gas chromatography of the reaction mixture showed acrylonitrile, solvent, and two product peaks. The reaction mixture was filtered and distilled to separate the products from the remainder of the reaction mixture. The infrared spectrum of the mixture of products showed strong nitrile and carboxylate ester bands. Elemental analysis and molecular weight by lowering of the vapor pressure of benzene ("Osmometer") were as follows:

|  |  | Compositions calculated for— | | |
| --- | --- | --- | --- | --- |
| Analysis | Found | 3,5,6-tricyano-hexanoic acid ethyl ester ($C_{11}H_{13}N_3O_2$) ($x$) | 3-cyano-3-cyano-methyl-glutaric acid diethyl ester ($C_{12}H_{16}N_2O_4$) ($g$) | Weight ratio, 70($x$)/30($y$) |
| Carbon, percent | 58.95 | 60.3 | 57.1 | 59.4 |
| Hydrogen, percent | 6.25 | 5.93 | 6.38 | 6.1 |
| Nitrogen, percent | 16.95 | 19.2 | 11.1 | 17.0 |
| Total | 82.15 |  |  |  |
| Oxygen, percent | 17.85 | 14.6 | 26.4 | 17.9 |
| Molecular weight | 243 | 219 | 252 | 228 |

A sample of 3,5,6-tricyanohexanoic acid ethyl ester prepared in another experiment carried out similarly had a boiling point of 155–160° C. at 2 millimeters and a refractive index $n_D^{23}$ or 1.4500.

The product of this reaction are of the $AB_2C$ and $ABC_2$ types, respectively.

EXAMPLE III

Into the reaction system were added in order:

19.6 g. (0.40 mole) of sodium cyanide (A)
49.0 g. (0.40 mole) of ethyl chloroacetate (C)
50 ml. dimethylformamide (solvent)

To this stirred mixture at 70° C. was added at a rate of about ½ ml./min.:

21.2 g. (0.40 mole) of acrylonitrile (B).

The reaction mixture was heated at 70° C. for 6 hours and thereafter maintained at about 25° C. for 18 hours after which the reaction mixture was filtered and distilled. Distillation data and gas-liquid chromatographic techniques showed 6 grams of 3-cyano-3-cyanomethyl-glutaric acid diethyl ester were formed and 24 grams of 3,5,6-tricyanohexanoic acid ethyl ester were formed.

The product of this reaction are of the $ABC_2$ and $AB_2C$ types, respectively.

EXAMPLE IV

In to the reaction system were added, in order:

36.3 g. of dimethylformamide (dry) (solvent)
42.2 g. (0.455 mole) of chloroacetone, freshly distilled, B.P. 118–121° C./750 mm. Hg (C)
24.2 g. (0.455 mole) of acrylonitrile (dry) (B)

This was cooled to 2° C. by an ice bath, then was added in one portion:

22.4 g. (0.455 mole) of sodium cyanide (dry) (A).

The reaction mixture was heated at a temperature in the range of from 2 to 20° C. for 6.8 hours after which it was maintained at about 25° C. for 40 hours. The reaction mixture was filtered and the filtrate distilled to produce 12 grams of the product compound 2-keto-4-oxa-methyl-7,8-dicyano-5-octene. Infrared spectrum analysis of the product showed strong bands at 8.6 microns assigned to C—O ether bond and weak bands at 6.2 microns assigned to C=C in an enol ether structure. The usual strong bands assigned to nitrile and carbonyl were also present. Elemental analysis and molecular weight obtained by lowering of the vapor pressure of benzene ("Osmometer") were as follows:

| Analysis | Found | Calculated for 2-keto-4-oxa-5-methyl-7,8-dicyano-5-octene, $C_{10}H_{12}N_2O_2$ |
| --- | --- | --- |
| Carbon, percent | 61.90 | 62.4 |
| Hydrogen, percent | 6.35 | 6.3 |
| Nitrogen, percent | 14.6 | 14.6 |
| Total | 82.65 |  |
| Oxygen, percent | 17.35 | 16.7 |
| Molecular weight | 235 | 192 |

This product is of the $ABC_2$ type.

EXAMPLE V

A reaction apparatus (standard except that a mechanical stirrer-slip gland was used) was purged with nitrogen by passing it down the condenser and out a powder funnel in one neck of the reaction flask. To it were charged in order:

85.3 g. (0.50 mole) of p-toluenesulfonyl chloride (Eastman white label) (C)
24.5 g. (0.50 mole) of NaCN, ground and dried (A)
75 g. of dimethylformamide dried over 4A° sieves (solvent)

A fast flush was given with $N_2$ and then flow was reduced while 26.5 g. (0.50 mole) of acrylonitrile (B) (dried over $BaCO_3$) was charged. The system was closed and nitrogen was passed through the flask and up the condenser at the rate of one bubble/15 sec.

The reaction mixture was heated at a temperature in the range of 80 to 90 C. for 8.5 hours after which it was maintained at about 25° C. for 42 hours. The reaction mixture was filtered and distilled to yield 12 grams of product boiling in the range of 157 to 200° C. at 4 millimeters, having a melting point of 161 to 166° C., being soluble in water and insoluble in benzene, and being non-polymeric in nature. The non-polymeric nature of the product indicates that, in view of the results of other examples, an ABC reaction took place and not an $AB_x$ polymerization reaction.

EXAMPLE VI

Into the reaction system were charged, in order:

26.5 g. (0.50 mole) of acrylonitrile (B)
63.5 g. (0.50 mole; 1.00 equivalent) of dimethyl sulfate (C)
76.5 g. of dimethylformamide (solvent)
24.5 g. (0.50 mole) of NaCN (A)

The reaction mixture was heated at a temperature in the range of 30 to 60° C. for 7 hours after which it was maintained at about 25° C. for 18 hours. The reaction mixture was filtered and distilled to produce 15 grams of a product having a boiling point of 90° C. at 1.5 millimeters, refractive index $n_D^{20}$ of 1.440, and was non-polymeric in nature. No trace of methyl cyanide was found in the product thereby eliminating the possibility of an AC reaction and combined with the absence of a polymer, indicating an ABC reaction took place.

EXAMPLE VII

Into the reaction system were charged, in order:

24.5% g. (0.500 mole) of sodium cyanide (A)
52 g. of dimethylformamide (solvent)
54.3 g. (0.443 mole) of ethyl chloroacetate (C)
50.0 g. (0.500 mole) of ethyl acrylate (B)

The cyanide was ground and dried for ½ hour. The other ingredients were dried over 4 A. mole sieves. A prepurified nitrogen flush was used but reduced to one bubble/15 seconds after the last ingredient was added.

The reaction mixture was heated in the temperature range of 70 to 105° C. for 6.5 hours after which it was maintained at about 25° C. for 15 hours, after which it was heated in the temperature range of 80 to 85° C. for 9 hours, maintained at about 25° C. for 15 hours, and reheated at 110° C. for 3 hours. Two products were obtained from filtering the reaction mixture and distilling the filtrate and were analyzed by gas-liquid chromatographic analysis. These products were 3-carboxy-5-cyanomethyl-adipic acid triethyl ester and 3-carboxy-3-cyanomethyl-glutaric acid triethyl ester. The 3-carboxy-5-cyanomethyl-adipic acid triethyl ester product had a boiling point of 162° C. at 1.5 millimeters. A distillation cut containing a mixture of these two products was analyzed by elemental analysis and the molecular weight was obtained by lowering of the vapor pressure of benzene ("Osmometer"), the results of which are as follows:

| Analysis | Found | Calculated for 14% 3-carboxy-3-cyanomethyl-glutaric acid triethyl ester ($C_{14}H_{21}NO_6$) and 86% 3-carboxy-5-cyanomethyl-adipic acid triethyl ester ($C_{15}H_{23}NO_6$) |
|---|---|---|
| Carbon, percent | 57.25 | 57.3 |
| Hydrogen, percent | 7.35 | 7.36 |
| Nitrogen, percent | 4.50 | 4.49 |
| Total | 69.10 | 69.15 |
| Oxygen, percent | 30.90 | 30.85 |
| Molecular weight | 312 | 311 |

The infrared spectrum of these products showed strong bands characteristic of carboxylate esters and a weak nitrile band.

The glutaric ester is of the $ABC_2$ type and the adipic ester is of the $AB_2C$ type.

EXAMPLE VIII

Into the reaction system were charged, in order:

43.0 g. (0.50 mole) of methyl acrylate (B)
54.3 g. (0.50 mole) of methyl chloroacetate (C)
67 g. of dimethylformamide (solvent)
24.5 g. (0.50 mole) of NaCN (A)

The reaction mixture was heated in the temperature range of 100 to 115° C. for 36 hours, thereafter maintained at about 25° C. for 70 hours. The reaction mixture was filtered and distilled. Gas-liquid chromatographic analysis of fractions of the distillate indicated 12 grams of 3-cyanomethylglutaric acid dimethyl ester and 19 grams of 2-cyanomethyl-adipic acid dimethyl ester were formed. The adipic acid ester had a boiling point of 126° C. at 1.5 millimeters. Elemental analysis of a distillate fraction containing both the glutaric acid ester and the adipic acid ester was carried out, the results being as follows:

| Analysis | Found | Calculated for 20% 3-cyanomethyl-glutaric acid dimethyl ester ($C_9H_{13}NO_4$), 80% 2-cyanomethyl-adipic acid dimethyl ester ($C_{10}H_{15}NO_4$) |
|---|---|---|
| Carbon, percent | 55.85 | 55.8 |
| Hydrogen, percent | 7.10 | 7.0 |
| Nitrogen, percent | 6.3 | 6.7 |
| Total | 69.25 | |
| Oxygen, percent | 30.75 | 30.5 |
| Molecular weight | 216 | 216 |

The infrared spectrum of this fraction showed strong nitrile and carboxylate ester bands.

The glutaric ester is a decarboxylated $ABC_2$ product and the adipic ester is decarboxylated $AB_2C$ product.

EXAMPLE IX

Into the reaction system were added, in order:

47.5 g. of dimethylformamide (solvent)
50.0 g. (0.50 mole) of ethyl acrylate (B)
61.3 g. (0.50 mole) of ethyl chloroacetate (C)

After chilling to 2° C. the following was added in one portion:

34.5 g. (0.50 mole) of sodium nitrite (A).

The reaction mixture was heated at 100° C. for 3 hours after which it was filtered and distilled to yield 30 grams of 3,4-bis(carbethoxy)-2-isoxazoline having a boiling point of 118° to 123° C. at 2 millimeters and a refractive index ($n_D^{20}$) of 1.4669.

Elemental analysis and molecular weight by lowering of the vapor pressure of benzene ("Osmometer") are given for the product:

| Analysis | Found | Atom ratio |
|---|---|---|
| Carbon, percent | 49.3 | 9.00 |
| Hydrogen, percent | 6.0 | 13.1 |
| Nitrogen, percent | 6.8 | 1.06 |
| Total | 62.1 | |
| Oxygen, percent | 37.9 | 5.18 |
| Molecular weight | 221 | |

NOTE.—See the following table:

| | C | H | N | mol wt. |
|---|---|---|---|---|
| Calculated for 3,4-bis (carbethoxy)-2-isoxazoline ($C_9H_{13}NO_5$) | 50.2 | 6.1 | 6.5 | 215 |
| Found | 49.4 | 6.2 | 6.7 | 213 |

Color tests on the product for nitro, nitrile and nitroso groups on the carbon atom were negative. The infrared spectrum of the product showed a strong band at 6.3 microns assigned to N=C in the isoxazole ring in addition to strong carboxylate ester bands. The nuclear magnetic resonance spectrum of the product showed a triplet at 275–305 c.p.s., a doublet at 185–205 c.p.s. plus the usual peaks at 220–225 c.p.s. and triplet at 60–90 c.p.s. characteristic of ethyl carboxylate esters. These observations are in agreement with:

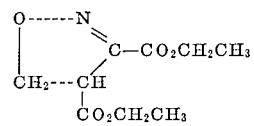

This is a self-condensed ABC product.

EXAMPLE X

Into the reaction system were charged, in order:

26.5 g. (0.50 mole) of acrylonitrile (B)
24.5 g. (0.25 mole; 0.50 equivalent) of ethylene dichloride (C)
65 g. of dimethylformamide (solvent)
88 g. (0.53 mole) of KI (dried 1 hour at 200° C.) (A)

The reaction mixture was heated at 65° C. for 7 hours and thereafter maintained at about 25° C. for 96 hours.

The reaction mixture was then filtered and the filtrate distilled. No polymer product was obtained, all of the acrylonitrile reacted, a color deveolped, and a fine precipitate formed, thereby indicating, in view of the results of other examples, an ABC reaction.

EXAMPLE XI

Into the reaction system were charged, in order:

54.3 g. (0.50 mole) of methyl chloroacetate (C)
43.0 g. (0.50 mole) of methyl acrylate (B)
65.0 g. of dimethyl formamide (solvent)
40.5 g. (0.50 mole) of NaSCN (ground, dried 0.5 hour at 200° C.) (A)

The reaction mixture was heated to 60–65° C. for 5½ hours, then maintained at about 25° C. for 18 hours, thereafter heated at 70° C. for 9 hours, and then maintained at about 25° C. for 18 hours.

The reaction mixture was filtered and then distilled. No polymeric substance was found in the reaction product, an exothermic reaction occurred, and a color developed, thereby indicating, in view of the results of other examples, an ABC reaction.

Reasonable variations and modifications are possible within the scope of this disclosure without departing from the spirit and scope thereof.

I claim:

1. A method for forming a nitrile compound comprising contacting under reaction conditions of a temperature of from about −25° C. to about 200° C., a pressure sufficient to maintain a substantially liquid reaction phase and in the presence of a dipolar aprotic solvent selected from the group consisting of N,N-dimethyl amides of the formula $$R\overset{O}{\overset{\|}{C}}N(CH_3)_2$$

wherein R is selected from the group consisting of hydrogen and alkyl radicals containing from 1 to 3 carbon atoms, inclusive, trimethylene sulfone, N-methyl-2-pyrrolidone, and sulfolane, (1) a nucleophile selected from the group consisting of compounds having formulas $M(CN)_n$, $M(NO_2)_n$, $MI_n$, $(R^2O)_nM$, and $(R^2S)_nM$;

(2) a compound selected from the group consisting of compounds having the formulas

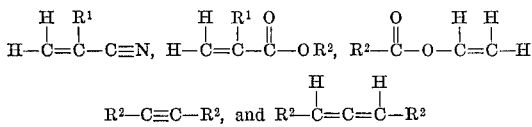

and (3) an alkylating agent selected from the group consisting of compounds having the formulas

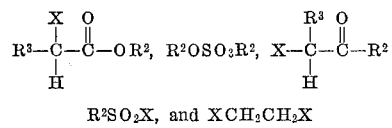

$R^2SO_2X$, and $XCH_2CH_2X$ wherein M is selected from the group consisting of alkali metals, magnesium and quaternary ammonium ions of the formula $(R^2)_4N^+$; $n$ is 1 or 2, $R^1$ is selected from the group consisting of hydrogen and methyl; $R^2$ is selected from the group consisting of alkyl, aryl, cycloalkyl and combination thereof containing up to 10 carbon atoms, inclusive; $R^3$ is selected from the group consisting of hydrogen and $R^2$; and X is chlorine or bromine, the mole ratios of the nucleophile to said compound (2) and of the alkylating agent to said compound (2) both being in the range of from about 0.1/1 to about 10/1; and wherein at least one of said nucleophile (1) and said compound (2) contains a —C≡N group.

2. The method according to claim 1 wherein the reaction is carried out in the presence of an aprotic solvent selected from the group consisting of trimethylene sulfone, N-methyl-2-pyrrolidone, and sulfolane; (1) said nucleophile is selected from the group consisting of compounds having formulas $M(CN)_n$, $M(NO_2)_n$, and $MI_n$; (2) said compound selected from the groups consisting of compounds having the formulas

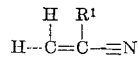

and

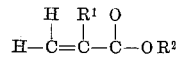

and (3) said alkylating agent is selected from the group consisting of compounds having formulas

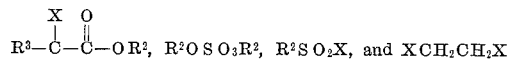

3. The method according to claim 1 wherein the contacting is in the presence of dimethylformamide or sulfolane, sodium cyanide, acrylonitrile, and ethyl chloroacetate, and the temperature is from about 0 to about 100° C. when dimethylformamide is used and from about 80 to about 200° C. when sulfolane is used.

4. The method according to claim 1 wherein the contacting is at a temperature of from about 0 to about 100° C. in the presence of dimethylformamide, sodium cyanide, ethyl acrylate, and ethyl chloroacetate.

5. The method according to claim 1 wherein the contacting is at a temperature of from about 0 to about 100° C. and in the presence of dimethylformamide; sodium cyanide, methyl acrylate and methyl chloroacetate.

References Cited

UNITED STATES PATENTS

| | | | |
|---|---|---|---|
| 2,396,626 | 3/1946 | Wiest | 260—465.4 |
| 2,468,352 | 4/1949 | Warner et al. | 260—465.4 |
| 2,506,050 | 5/1950 | Warner et al. | 260—465.4 |
| 2,843,603 | 7/1958 | Stork | 260—465.4X |
| 3,028,412 | 4/1962 | Bortnick et al. | 260—465.4X |
| 3,058,983 | 10/1962 | Johnson | 260—465.4X |
| 3,077,475 | 2/1963 | Johnson | 260—465.4X |
| 3,137,700 | 6/1964 | Johnson | 260—465.4X |

JOSEPH P. BRUST, Primary Examiner

U.S. Cl. X.R.

260—307, 454, 464, 465, 465.5, 465.7, 465.8, 537